D. J. ANGUS.
VOLT AMPERE METER.
APPLICATION FILED AUG. 25, 1919.
1,342,081.
Patented June 1, 1920.
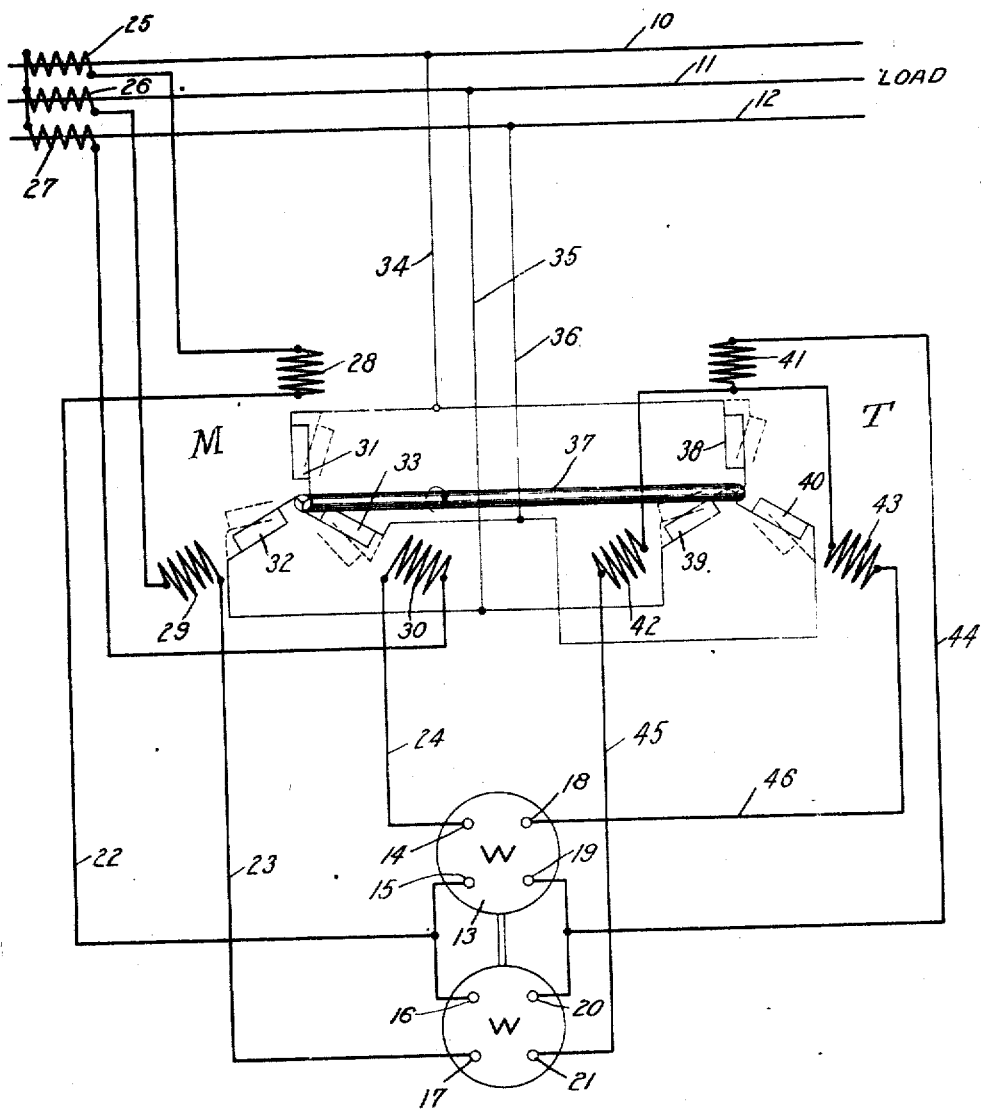
Inventor
DONALD J. ANGUS
By Hood & Schley
Attorneys

UNITED STATES PATENT OFFICE.

DONALD J. ANGUS, OF INDIANAPOLIS, INDIANA.

VOLT-AMPERE METER.

1,342,081.  Specification of Letters Patent.  Patented June 1, 1920.

Application filed August 25, 1919. Serial No. 319,765.

*To all whom it may concern:*

Be it known that I, DONALD J. ANGUS, a citizen of the United States, residing at Indianapolis, in the county of Marion and State of Indiana, have invented a new and useful Volt-Ampere Meter, of which the following is a specification.

It is the object of my invention to measure the product of the current and the voltage in alternating current circuits regardless of the phase displacement of the current from the voltage. In other words, the object is to give a true volt-ampere measurement regardless of power factor.

In accomplishing this result, I supply one winding of a watt-meter through a transformer having a rotating magnetic field, of which transformer at least the primary has a polyphase winding and the primary and secondary are relatively mechanically rotatable to vary the phase relationship between the circuits thereof; and I connect the movable member of this transformer to the movable member of a motor device, of which one member has a field excited in definite phase relationship with the voltage, and the other member a field excited in definite phase relationship with the current of the main circuit, at least one of the members of the motor device having a rotating magnetic field. In consequence, upon any phase shift of the current relative to the voltage in the main circuit, whether by lag or lead, there is a relative mechanical movement between the two members of the motor device to maintain thereby the no-torque relation between the magnetic fields of such two members; and this mechanical movement of the movable element of the motor device produces a mechanical movement of the movable element of the rotating-field transformer to produce a phase shift in the secondary circuit thereof to correspond to the phase shift of the current, so that the phase relationship between the current and the voltage supplied to the meter is maintained always constant.

The accompanying drawing illustrates my invention, in a system with the rotating-field transformer controlling the phase position of the voltage impressed on the meter. In such drawing, the single figure is a semi-diagrammatic view showing the essential elements of one form of my invention, and their electrical connections.

The three-phase circuit 10-11-12 is the one of which the volt-ampere consumption is to be measured. The meter 13 may be any standard watt-meter, having terminals 14, 15, 16, and 17 for its current coils and terminals 18, 19, 20, and 21 for its voltage coils.

In the system shown in the drawing, the current-coil terminals are connected by wires 22, 23, and 24 to the usual current transformers 25, 26, and 27, which are suitably connected in the main circuit. In these wires, however, are connected the exciting coils 28, 29, and 30 of one element, here shown as the stationary element, of a motor device M, so that a rotating magnetic field in definite phase relationship with the current in the main circuit is produced in such element. The other element, in this case the movable element, of such motor device is provided with three exciting coils 31, 32, and 33, which are connected by wires 34, 35, and 36 across the main circuit 10-11-12 so that there is produced in this element of the motor device a rotating magnetic field in definite phase relationship with the voltage of the main circuit. The connections are such that these two magnetic fields rotate in the same direction. The movable element of the motor device is free to rotate, and it tends to take a position so that its rotating magnetic field is exactly in spatial phase with the rotating magnetic field in the other element. In case of a phase shift of the current relative to the voltage in the main circuit, whether by lag or lead, the current-produced field in the motor device M correspondingly lags or leads; and in consequence the movable element of the motor device moves in the direction in which the phase shift of the current-produced field has occurred, and by the same amount, to maintain at all times the coincidences of and the no-torque relation between the voltage-produced field and the current-produced field. This same result is obtained if there is only one rotating magnetic field in this motor device, and the other magnetic field is a mere alternating field produced by a single phase. In other words, for instance, the coils 32 and 33, or the coils 29 and 30, may be omitted, and the action will be the same.

The movable element of the motor device M is connected by a shaft 37 to the movable element of a rotating-field transformer T, which in the system shown controls the phase of the voltage impressed on the meter 13. The two elements of the transformer are relatively mechanically rotatable. The movable element of this transformer may be either the primary or the secondary, but as shown is the primary. The primary winding is a polyphase winding, and comprises three coils 38, 39, and 40, which are connected to the wires 34, 35, and 36 in the same way as are the coils 31, 32, and 33, so that they produce a rotating field in definite phase relationship with and proportional to the voltage of the main circuit 10-11-12. The secondary winding of the transformer T, as shown, is also a polyphase winding, though that is not essential, and comprises three coils 41, 42, and 43, in which currents are induced by the rotating field produced by the coils 38, 39, and 40. The secondary coils 41, 42, and 43 are connected by wires 44, 45, and 46 to the voltage terminals of the watt-meter 13, to impress upon such voltage terminals a voltage proportional to the voltage of the main circuit 10-11-12.

The phase relationship between the voltage impressed on the voltage terminals of the watt-meter and the voltage of the main circuit, however, may vary, depending upon the mechanical position of the movable member of the transformer T; and this mechanical position depends upon the position of the motor device M. When by reason of a phase shift of the current in the main circuit in relation to the voltage thereof the movable element of the motor device M moves mechanically backward or forward in correspondence with such phase shift, it produces a corresponding mechanical movement of the movable element of the transformer T. This mechanical movement of the movable element of the transformer T produces a corresponding phase shift in the voltage induced in the secondary coils 41, 42, and 43; and thus a corresponding phase shift in the voltage impressed on the voltage terminals of the watt-meter. This phase shift of the voltage impressed on the watt-meter exactly corresponds to the phase shift of the current in the main circuit, which latter phase shift caused the mechanical movements of the movable members of the motor device M and transformer T; so that the phase position of the voltage impressed on the watt-meter shifts correspondingly with the current supplied to the current coils of the watt-meter. In other words, the voltage impressed on the watt-meter is always maintained in a definite and unchangeable phase relationship with the current supplied thereto; so that the watt-meter itself always operates at a constant power factor, and so gives a true indication of the product of the current and the voltage irrespective of the power factor of the circuit 10-11-12.

I have shown my invention with all the windings star-connected, and as applied only to a three-phase circuit, and with the transformer T controlling the phase position of the voltage impressed in the watt-meter. The invention, however, is not limited to star-connected windings or to three-phase circuits, but is applicable to any kind of connections and to any kind of circuits whereby rotating magnetic fields are producible. Neither is it limited, in its broader aspects, to the phase control of the voltage impressed on the watt-meter, for it is applicable to control in any other way the phase relationship between the voltage impressed on and the current supplied to the respective sets of watt-meter windings.

I claim as my invention:

1. In combination, a meter having voltage and current windings, a transformer having relatively movable primary and secondary members of which at least the primary member is wound to produce a rotating magnetic field, the winding of the secondary member being connected to the voltage winding of said meter and the winding of the primary member being arranged for voltage connection across a polyphase circuit, and a motor device mechanically connected to said transformer and having two relatively movable members one of which is arranged to be excited in definite phase relationship with the primary of said transformer and the other of which is arranged to be excited in definite phase relationship with the current supplied to the current winding of the meter.

2. In combination, a meter having voltage and current windings, a transformer having relatively movable primary and secondary members of which at least the primary member is wound to produce a rotating magnetic field, the winding of the secondary member being connected to the voltage winding of said meter and the winding of the primary member being arranged for voltage connection across a polyphase circuit, and a motor device mechanically connected to said transformer and having two relatively movable members one of which is arranged to be excited in definite phase relationship with the primary of said transformer and the other of which is arranged to be excited in definite phase relationship with the current supplied to the current winding of the meter, the magnetic field produced by one of the members of said motor device being a rotating magnetic field.

3. In combination, a rotating-field transformer having relatively movable primary and secondary windings at least the primary of which is wound to produce a rotating magnetic field, said primary winding being arranged to have voltage connections to a circuit in which the volt-ampere consumption is to be measured, a meter having current coils arranged to have current connections to said circuit and voltage coils connected to the secondary winding of said transformer, and a motor device mechanically connected to said transformer to control the relative positions of the primary and secondary windings thereof, said motor device being wound so that its position is controlled by the phase displacement of the current from the voltage in such circuit.

4. In combination, a rotating-field transformer having relatively movable primary and secondary windings at least the primary of which is wound to produce a rotating magnetic field, said primary winding being arranged to have voltage connections to a circuit in which the volt-ampere consumption is to be measured, a meter having current coils arranged to have current connections to said circuit and voltage coils connected to the secondary winding of said transformer, and a motor device having a movable member mechanically connected to the movable member of said transformer, the windings of said motor device being arranged so that the position of the movable member of said motor device is a function of the phase displacement of the current from the voltage in said circuit.

5. In combination, a meter having current and voltage windings, connections from such meter windings to a circuit in which the volt-ampere consumption is to be measured, a motor device having a movable member and provided with windings which cause said movable member to take a position which is a function of the phase displacement of the current from the voltage in said circuit, and means operated by the movable member of said motor device for producing a corresponding phase displacement in the voltage impressed on the voltage winding of said meter.

6. In combination, a meter having current and voltage windings, connections from such meter windings to a circuit in which the volt-ampere consumption is to be measured, a motor device having a movable member and provided with windings which cause said movable member to take a position which is a function of the phase displacement of the current from the voltage in said circuit, and a rotating field transformer having a movable member connected to the movable member of said motor device to take positions corresponding thereto, said transformer being connected in the connections between said circuit and the voltage winding of the meter so that the phase position of the voltage impressed on said voltage winding is controlled by the position of the movable member of said transformer.

7. In combination, a meter having voltage and current windings arranged for voltage and current connection respectively to a circuit in which the volt-ampere consumption is to be measured, a motor device also arranged to be connected to said circuit and having a movable member the position of which is controlled by phase shift of the current relative to the voltage in said circuit, and means operated by said motor device for producing corresponding phase shifts in the voltage impressed on the voltage winding of said meter.

8. In combination, a meter having voltage and current windings arranged for voltage and current connection respectively to a circuit in which the volt-ampere consumption is to be measured, a motor device also arranged to be connected to said circuit and having a movable member the position of which is controlled by phase shift of the current relative to the voltage in said circuit, and a rotating field transformer arranged in the connections from said circuit to the voltage winding of said meter and having its primary and secondary windings relatively mechanically movable by said motor device to produce phase shifts in the voltage impressed on the voltage winding of the meter correspondingly with the phase shifts of the currents supplied to the current windings of the meter.

9. In combination, a meter having current and voltage windings arranged for current and voltage connection respectively to a circuit in which the volt-ampere consumption is to be measured, a motor device having two relatively movable members arranged for excitation in definite phase relationship with the current and the voltage respectively in said circuit at least one of said members having a rotating field, and a rotating field transformer having relatively movable primary and secondary members the relative positions of which are controlled by the relative positions of the two members of said motor device, said rotating field transformer being connected in the connections from one winding of said meter to said circuit to produce in the current supplied to said winding phase shifts to compensate for the phase shifts of the current relative to the voltage in said circuit.

10. In combination, a meter having current and voltage windings arranged for current and voltage connection respectively to a circuit in which the volt-ampere consumption is to be measured, a motor device having two relatively movable members arranged for excitation in definite phase relationship with the current and the voltage respectively in said circuit at least one of said members having a rotating field, and means controlled by the relative position of the two members of said motor device for producing in the current supplied to one set of windings of said meter phase shifts to compensate for phase shifts of the current relative to the voltage in said circuit and thus maintain constant the phase relationship between the currents carried by the two sets of windings of said meter.

11. In combination, a meter having current and voltage windings, connections from such meter windings to a circuit in which the volt-ampere consumption is to be measured, a motor device having a movable member and provided with windings which cause said movable member to take a position which is a function of the phase displacement of the current from the voltage in said circuit, and means operated by the movable member of said motor device for producing in the current supplied to one winding of the meter phase shifts to compensate for phase shifts of the current relative to the voltage in said circuit to maintain in constant phase relationship the currents in the voltage and current winding of the meter.

12. In combination, a meter having current and voltage windings, connections from such meter windings to a circuit in which the volt-ampere consumption is to be measured, a motor device having a movable member and provided with windings which cause said movable member to take a position which is a function of the phase displacement of the current from the voltage in said circuit, and a rotating field transformer having a movable member connected to the movable member of said motor device to take positions corresponding thereto, said transformer being connected in the connections between said circuit and one winding of the meter so that a compensating phase displacement will be produced in such meter winding.

13. In combination, a meter having current and voltage windings, connections from such meter windings to a circuit in which the volt-ampere consumption is to be measured, a motor device having a movable member and provided with windings which cause said movable member to take a position which is a function of the phase displacement of the current from the voltage in said circuit, and means operated by the movable member of said motor device for producing in the voltage impressed on the voltage winding of said meter a phase displacement from the voltage of said circuit which is a function of the first-named phase displacement.

14. In combination, a rotating field transformer having relatively movable primary and secondary members, at least the primary member of said transformer being wound to produce a rotating magnetic field, the primary winding of said transformer being connected so that it is excited in proportion to and in definite phase relationship with the voltage of an alternating current circuit, and a motor device mechanically connected to said transformer to control the relative positions of the primary and secondary members thereof, said motor device being wound so that its position is controlled by the phase displacement of the current from the voltage in said circuit.

15. In combination, a rotating field transformer having relatively movable primary and secondary members, at least the primary member of said transformer being wound to produce a rotating magnetic field, the primary winding of said transformer being connected so that it is excited in proportion to and in definite phase relationship with the voltage of an alternating current circuit, and a motor device mechanically connected to said transformer to control the relative positions of the primary and secondary members thereof, said motor device having two relatively mechanically movable members which are excited in definite phase relationship to the voltage and to the current respectively of said circuit.

16. In combination, a rotating field transformer having relatively movable primary and secondary members, at least the primary member of said transformer being wound to produce a rotating magnetic field, the primary winding of said transformer being connected so that it is excited in proportion to and in definite phase relationship with the voltage of an alternating current circuit, and a motor device having a movable member mechanically connected to the movable member of said transformer, the windings of said meter device being arranged so that the position of the movable member thereof varies with phase shifts of the current relative to the voltage in said circuit in the proper direction and by the proper amount to produce a phase shift of the voltage in the secondary winding of said transformer to maintain the secondary voltage of said transformer in definite phase relationship with the current of said circuit.

17. In combination, a meter having voltage and current windings arranged for voltage and current connection respectively to a circuit in which the volt-ampere consumption is to be measured, a motor device also arranged to be connected to said circuit and having a movable member the position of which is controlled by phase shift of the current relative to the voltage in said circuit, and means operated by said motor device for producing phase shifts in the current supplied to one of the meter windings by amounts corresponding to said first named phase shifts and in the proper direction to maintain constant the phase relationship between the currents in the voltage and current windings of the meter.

18. In combination, a meter having voltage and current windings arranged for voltage and current connection respectively to a circuit in which the volt-ampere consumption is to be measured, a motor device also arranged to be connected to said circuit and having a movable member the position of which is controlled by phase shift of the current relative to the voltage in said circuit, and a rotating field transformer arranged in the connections from said circuit to one of the windings of said meter and having its primary and secondary windings relatively mechanically movable by said motor device to produce phase shifts in the current supplied to that meter winding by amounts corresponding to the first named phase shifts and in the proper direction to maintain constant the phase relationship between the currents in the voltage and current windings of the meter.

19. In combination, a rotating field transformer having relatively movable primary and secondary members, at least the primary member of said transformer being wound to produce a rotating magnetic field, the primary winding of said transformer being connected so that it is excited from an alternating current circuit, and a motor device mechanically connected to said transformer to control the relative positions of the primary and secondary members thereof, said motor device being wound so that its position is controlled by the phase displacement of the current from the voltage in said circuit.

20. In combination, a rotating field transformer having relatively movable primary and secondary members, at least the primary member of said transformer being wound to produce a rotating magnetic field, the primary winding of said transformer being connected so that it is excited from an alternating current circuit, and a motor device mechanically connected to said transformer to control the relative positions of the primary and secondary members thereof, said motor device having two relatively mechanically movable members which are excited in definite phase relationship to the voltage and to the current respectively of said circuit.

In witness whereof, I have hereunto set my hand at Indianapolis, Indiana, this eighth day of August, A. D. one thousand nine hundred and nineteen.

DONALD J. ANGUS.